United States Patent [19]

Fowler et al.

[11] 4,218,678
[45] Aug. 19, 1980

[54] SYNTHETIC PULSE RADAR INCLUDING A MICROPROCESSOR BASED CONTROLLER

[75] Inventors: James C. Fowler, Burke; Llewellyn A. Rubin, Annandale; William L. Still, Purcellville, all of Va.

[73] Assignee: Ensco, Inc., Springfield, Va.

[21] Appl. No.: 38,289

[22] Filed: May 11, 1979

[51] Int. Cl.³ .......................... G01S 9/02; G01V 1/00
[52] U.S. Cl. .............................. 343/5 FT; 343/5 NA; 367/37; 367/41
[58] Field of Search ............ 343/5 FT, 5 NA, 17.1 R, 343/5 BB, 7.6; 367/37, 41

[56] References Cited

U.S. PATENT DOCUMENTS

| | | | |
|---|---|---|---|
| 2,754,492 | 7/1956 | Parker | 343/5 NA X |
| 3,339,198 | 8/1967 | Glegg | 343/17.1 R X |
| 3,636,333 | 1/1972 | Klund | 324/77 H X |
| 3,686,669 | 8/1972 | Toulis | 343/5 BB X |
| 3,806,795 | 4/1974 | Morey | 343/5 NA X |
| 3,890,618 | 6/1975 | Speiser | 343/17.1 R |
| 3,896,434 | 7/1975 | Sirven | 343/17.1 R X |
| 3,987,285 | 10/1976 | Perry | 343/5 FT X |
| 4,003,054 | 1/1977 | Goldstone | 343/5 FT X |

OTHER PUBLICATIONS

"Location and Recognition of Discontinuities in Dielectric Media Using Synthetic RF Pulses" by L. A. Robinson et al., Proceedings of the IEEE, vol. 62, No. 1, Jan. 1974, pp. 36-44.

Primary Examiner—Malcolm F. Hubler
Attorney, Agent, or Firm—Sixbey, Friedman & Leedom

[57] ABSTRACT

This invention relates to pulse radar detection of targets in extended media, including natural phenomena such as oil, coal and ore deposits within the earth. In particular, this invention relates to a pulse radar system employing a synthetic pulse formed from a Fourier spectrum of frequencies generated and detected by a digitally controlled transmitter and receiver circuits.

15 Claims, 6 Drawing Figures

SYNTHETIC PULSE RADAR INCLUDING A MICROPROCESSOR BASED CONTROLLER

BACKGROUND ART

The advantages of using impulse or short pulse radar for detecting discontinuities in dielectric media is well recognized as disclosed in U.S. Pat. No. 4,072,942 to Alongi, U.S. Pat. No. 4,008,469 to Chapman and U.S. Pat. No. 3,806,795 to Morey. Systems of the type disclosed in these patents operate by radiating a pulse of only one or a few excursions containing a broad spectrum of radio frequencies enabling the system to detect target phenomena of widely varying characteristics. When radiated into a dielectric medium, short pulses are reflected by discontinuities in the medium in a manner which allows the pulse echo to be detected and analyzed to provide information about the location and size of the discontinuity. Generation of a short pulse in real time, however, involves two serious drawbacks. The first is the necessity of recording the high-frequency data with a reasonable dynamic range, while the second is the problem of designing an antenna capable of coupling the broad band energy efficiently into the ground. The first problem can be solved in part by using a hetrodyne receiver technique. The problem of efficient antenna coupling is much more difficult. Normally, attempts to solve this problem have involved building a broad band antenna designed to have a minimum of reflections. While such an antenna operates well to transmit energy into the medium, it is by necessity a low-gain antenna system.

One prior attempt to overcome the drawbacks of real time pulse radar has been the development of a synethetic short pulse radar in which continuous wave measurements are made at many selected frequencies defining a Fourier spectrum of frequencies equivalent to the bandwidth of a short radio frequency pulse. This prior art system is disclosed in Robinson, L. A. et al., "Location and Recognition of Discontinuities in Dielectric Media Using Synthetic R F Pulses," Proceedings of the IEEE, Vol. 62, No. 1, January 1974, pages 36–44 and in Robinson, L. A. et al., "An R F Time-Domain Reflectometer Not in Real Time", IEEE Transactions on Microwave Theory and Tech., Vol. MTT-20, pages 855–857. In the system disclosed in these articles, a computer is used to control the sequence of measurements, to store the measured parameters and to process the stored parameters to permit a synthetic pulse echo to be displayed. Since the amplitudes and phases of the spectral lines can be individually controlled, the synthetic radar pulse may be shaped to achieve optimum tradeoff between short pulse width, small ringing on the baseline between pulses, and total bandwidth covered by the spectrum.

While synthetic radar pulse systems possess numerous theoretical advantages over real time pulse radar, the circuitry designs employed heretofor to implement such synthetic pulse systems have involved considerable impractical complexities. For example, the circuitry disclosed in the above noted Robinson et al. articles include a "tunable" oscillator requiring external frequency-stabilizing circuitry to obtain the necessary degree of stability in the frequency output of the oscillator. Such frequency-stabilizing circuitry adds to the complexity and cost of implementing such a system. Moreover, a "tunable" oscillator would not be directly compatible with standard digital logic circuitry such as a microprocessor system which, given the present state of the art in circuit design would provide the least expensive and most reliable approach toward implementation of the control circuitry of a synthetic pulse system. Moreover, no prior art synthetic short pulse radar system has disclosed a short pulse frequency spectrum which has been shown to be ideally suited for detection of particular targets such as hazards within a coal mine.

Other forms of known subsurface target detecting systems employing radar are disclosed in U.S. Pat. Nos. 3,903,520; 3,831,173 and 3,903,520 but none of these systems embodies the advantages of synthetic R F pulse radar wherein the transmitter and receiver circuit designs are compatible with integrated circuit control components.

DISCLOSURE OF THE INVENTION

It is a basic object of this invention to overcome the deficiencies of the prior art as noted above. In particular, it is an object of this invention to provide a digitally controlled, synthetic pulse radar apparatus and method which are more compatible with integrated circuit control components.

Another object of this invention is to provide a digitally controlled, synthetic pulse radar including a master oscillator for generating a base periodic signal and a synthesizer for generating the Fourier spectrum of frequencies of a desired synthetic radar pulse by successively multiplying the base periodic signal by each integer in a series of integers represented by digital signals received from a microprocessor based controller.

Yet another object of the subject invention is to provide a synthetic pulse radar wherein the transmitter includes an attenuator control for controlling the strength of the periodic component signals making up the Fourier spectrum in response to an attenuator control signal from the microprocessor based controller. The disclosed system further provides gain control circuitry for controlling the strength of the electrical signal representative of the recovered portion of each returned Fourier spectrum frequency in response to a gain control signal from the microprocessor based controller. The controller is designed to generate both the attenuator control signal and the gain control signal to optimize signal to noise ratio.

Still another object of the subject invention is to provide a synthetic pulse radar including a receiver circuit for determining both amplitude and phase differences between the individual broadcast frequency signals (periodic component signals) and the electrical signals generated by the receiver circuit which electrical signals are representative of the recovered portions of the periodic component signals returned from the geophysical phenomena being measured. The receiver circuit includes a circuit, such as a quadrature circuit, for producing in-phase reference signals which have a known fixed frequency and phase relationship to the periodic component signals broadcast by the transmitter circuit. The quadrature circuit also produces quadrature reference signals which have the same frequency and a 90° phase difference relative to the periodic component signals broadcast by the transmitter circuit. Both the in-phase reference signals and the quadrature reference signals are mixed with the electrical signal representative of the portion of the periodic component signal returned from the geophysical phenomena to yield both phase and amplitude information. After further preliminary processing by the microprocessor, the phase and amplitude information is subjected to an inverse Fourier transform to produce a synthetic echo pulse containing information regarding characteristics of the geophysical phenomena being measured.

A more specific object of the subject invention is to provide a quadrature circuit for a synthetic pulse radar system including a frequency doubler and interconnected divider circuits for producing, respectively, an in-phase base reference signal having the same frequency and phase as the periodic component signal being broadcast and a quadrature base reference signal having the same frequency and a 90° phase shift relative to the periodic component signal being broadcast by the transmitter circuit.

A still more specific object of this invention is to provide a synthetic pulse radar including a microprocessor based controller having input means for receiving operator commands defining the minimum and maximum frequencies of the periodic component signals to be generated by the transmitter circuit and defining each of a series of integer values by which a periodic base signal produced by a master oscillator is to be multiplied in order to generate the spectrum of Fourier frequencies defining the synthetic pulse produced by the transmitter.

Another object of the subject invention is to provide a synthetic pulse radar for detecting geophysical phenomena at a maximum range of up to 2500 feet including a transmitter circuit for generating a Fourier spectrum of a desired radar pulse suitable for transmission toward and a modulation by geophysical targets wherein such frequency spectrum is made up of frequencies between 16 MHz and 160 MHz separated by at least 100 KHz.

Still another object of this invention is to provide a method for detecting geophysical phenomena including the steps of generating a base periodic signal having a predetermined base frequency, generating a succession of digital signals representative of a series of integers which when multiplied times the base frequency yields a plurality of frequencies representing the Fourier spectrum of a desired radar pulse, and generating successively a plurality of periodic component signals having frequencies corresponding to the plurality of frequencies representing the Fourier spectrum of the desired radar pulse combined with the steps of broadcasting, receiving and processing the periodic component signals.

Still other and more specific objects of the subject invention may be appreciated by consideration of the following Brief Description of the Drawings and the following Description of the Best Mode for Carrying Out the Invention.

BEST MODE FOR CARRYING OUT THE INVENTION

Figure 1:
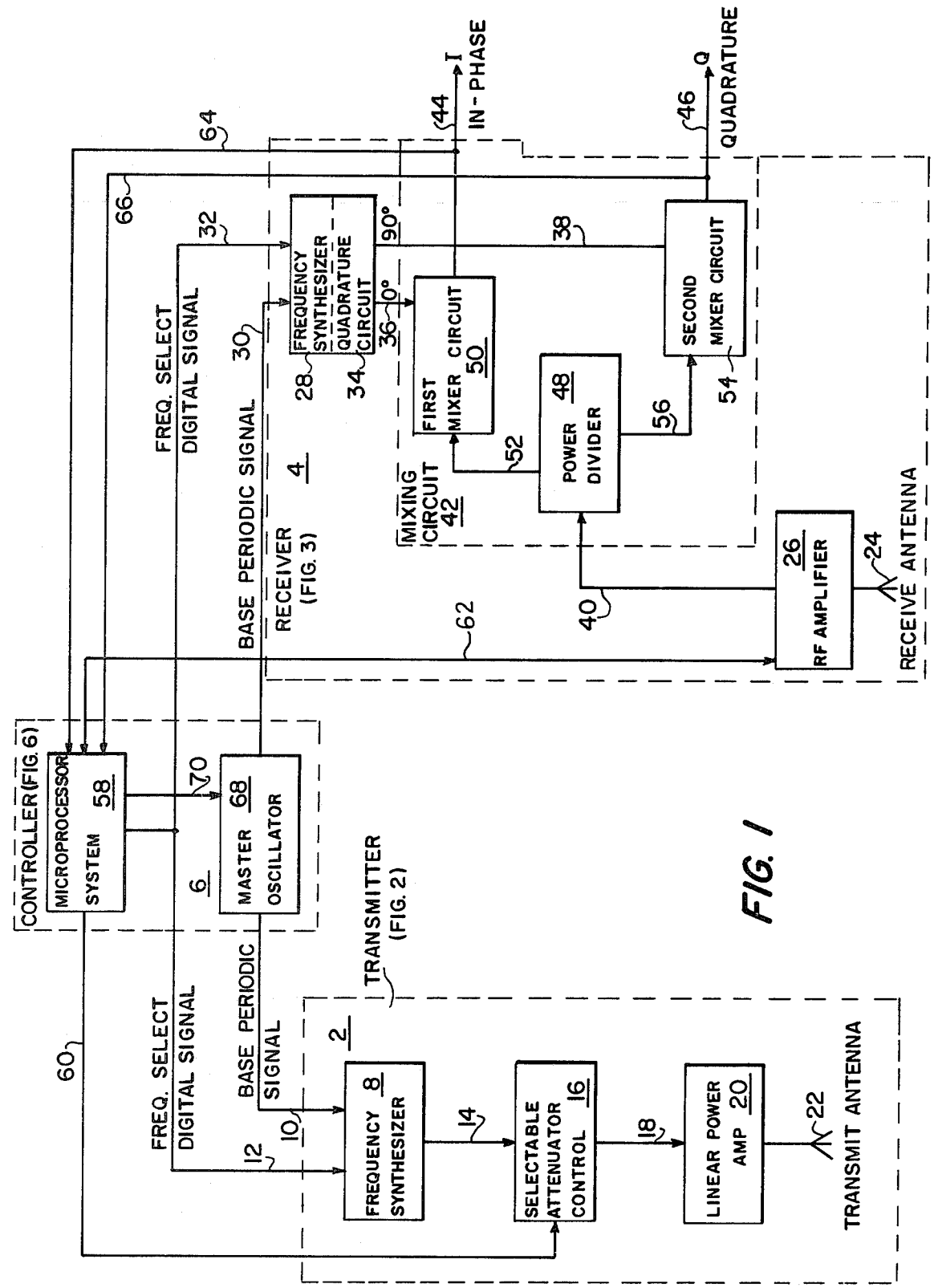
FIG. 1 is a schematic diagram of a synthetic pulse radar system designed in accordance with the subject invention.

A synthetic pulse radar system designed in accordance with the subject invention is illustrated in FIG. 1 including, basically, a transmitter 2, a receiver 4 and a microprocessor based controller 6. An important feature of the disclosed system is its compatibility with standard integrated digital logic circuitry which eliminates the need for specialized frequency stabilization circuitry and/or command signal buffers for interfacing the microprocessor based controller with the circuitry forming the transmitter 2 and receiver 4.

The transmitter 2 is designed to produce a Fourier spectrum of frequencies equivalent to a desired synthetic radar pulse. This synthetic pulse is formed by generating during each of a plurality of successive time intervals one of a corresponding plurality of periodic component signals each of which has a uniquely discrete frequency which is an integral multiple of a predetermined base frequency. Transmitter 2 includes a frequency synthesizer 8 for receiving a base periodic signal on line 10 and a digital signal on line 12 which signals are multiplied to produce a first base reference signal. The output of synthesizer 8 is transmitted over line 14 to an attenuator control circuit 16 designed to control the strength of the periodic component signals broadcast by the transmitter 2 by controlling the attenuation of the first base reference signals produced by the frequency synthesizer 8. The output from attenuator control 16 is transmitted over line 18 to linear power amplifier 20 designed to supply the periodic component signals of the synthetic radar pulse to antenna 22. The organization and the specific function of the various components making up transmitter 2 will be described in further detail hereinbelow with reference to FIG. 2.

Receiver 4 is designed to recover representative parameters of each of the periodic component signals which have been broadcast by transmitter 2 and modulated by the geophysical phenomena being measured. Such phenomena may include coal mine hazards, subsurface geological features such as the interfaces between geological strata, the material of the strata, the presence of boulders, rock or aggregate, the depth through overburden to bedrock, the presence and extent of cavities or voids in limestone or other materials and the depth to water table. Other phenomena which may be detected by apparatus of this type include buried artifacts including metallic or non-metallic utility pipes, conduits, and lines such as might be used for water, gas and sewage and other buried metallic and non-metallic objects.

Receiver 4 includes a receive antenna 24 for picking up the returned portion of a broadcast periodic component signal and for providing a signal to a radio frequency amplifier 26. Amplifier 26 amplifies the antenna signal to provide an electrical signal representative of a portion of the energy of each broadcast periodic component signal which has been modulated by the geophysical phenomena being tested.

Receiver 4 further includes a frequency synthesizer 28 similar to the frequency synthesizer 8 of the transmitter 2 in that the synthesizer 28 performs the function of multiplying the base periodic signal received on line 30 times the digital signals received on line 32 in order to produce a first base reference signal having the same frequency and phase as the periodic component signal being broadcast at any given time by transmitter 2. The digital signals received on lines 12 and 32 by synthesizers 8 and 28, respectively, can therefore be considered as frequency selecting signals.

Frequency synthesizer 28 differs from synthesizer 8 by the addition of a quadrature circuit 34 designed to convert the first base reference signal into an in-phase reference signal supplied to line 36 and a quadrature reference signal supplied to line 38. The in-phase reference signal has the same frequency and phase as the periodic component signal being broadcast at any given time by transmitter 2 while the quadrature reference signal has the same frequency but a 90° phase shift relative to the periodic component signal being broadcast at any given time by transmitter 2. The exact manner by which the in-phase and quadrature reference signals are formed by quadrature circuit 34 will be discussed in greater detail hereinbelow with reference to FIG. 5.

The reference signals supplied to lines 36 and 38 and the output electrical signal from R F amplifier 26 supplied to line 40 form the inputs to a mixing circuit 42. The function of circuit 42 is to produce a parameter signal on output lines 44 and 46 representing the recovered parameters for each corresponding periodic component signal broadcast by transmitter 2. In particular, mixing circuit 42 is designed to mix the electrical signal supplied on line 40 (which represents a portion of the energy of each periodic component signal modulated by a geophysical phenomena) with the reference signals supplied on lines 36 and 38, respectively, to form the parameter signal having an in-phase component provided on line 44 and a quadrature component provided on line 46. Mixing circuit 42 includes a power divider circuit 48 for supplying the electrical signal supplied from line 40 to a first mixer circuit 50 over line 52 and a second mixer circuit 54 over line 56. Power divider 48 is characterized by a zero phase shift in the signals supplied to lines 52 and 56 relative to the input electrical signal received on line 48 from amplifier 26.

Syncronous operation of both the transmitter 2 and receiver 4 is accomplished by means of the microprocessor based controller 6 designed to provide the frequency selecting digital signals to lines 12 and 32 in accordance with a preprogrammed spectrum of frequencies. The spectrum of frequencies may be selectively modified by the system user as desired to provide the best possible synthetic radar pulse for a given set of operating conditions. Controller 6 is also designed to receive the in-phase and quadrature component signals from lines 44 and 46. These signals are converted to digital format and stored by the microprocessor for subsequent inverse transforming to produce information about a geophysical phenomena as will be discussed in greater detail hereinbelow with reference to FIG. 6. The microprocessor system 58 is further designed to supply attenuator control signals to line 60 and amplifier gain control signals to amplifier 26 over line 62 in accordance with the strength of the in-phase and quadrature component signals received over lines 64 and 66 connected with lines 44 and 46, respectively. Controller 6 includes a master oscillator 68 for generating and supplying the base periodic signal to lines 10 and 30 to thereby syncronize operation of both the transmitter and receiver. Operation of the microprocessor system 58 and master oscillator circuit 68 may also be syncronized by providing the microprocessor clock signal to the master oscillator 68 over line 70.

Figure 2:
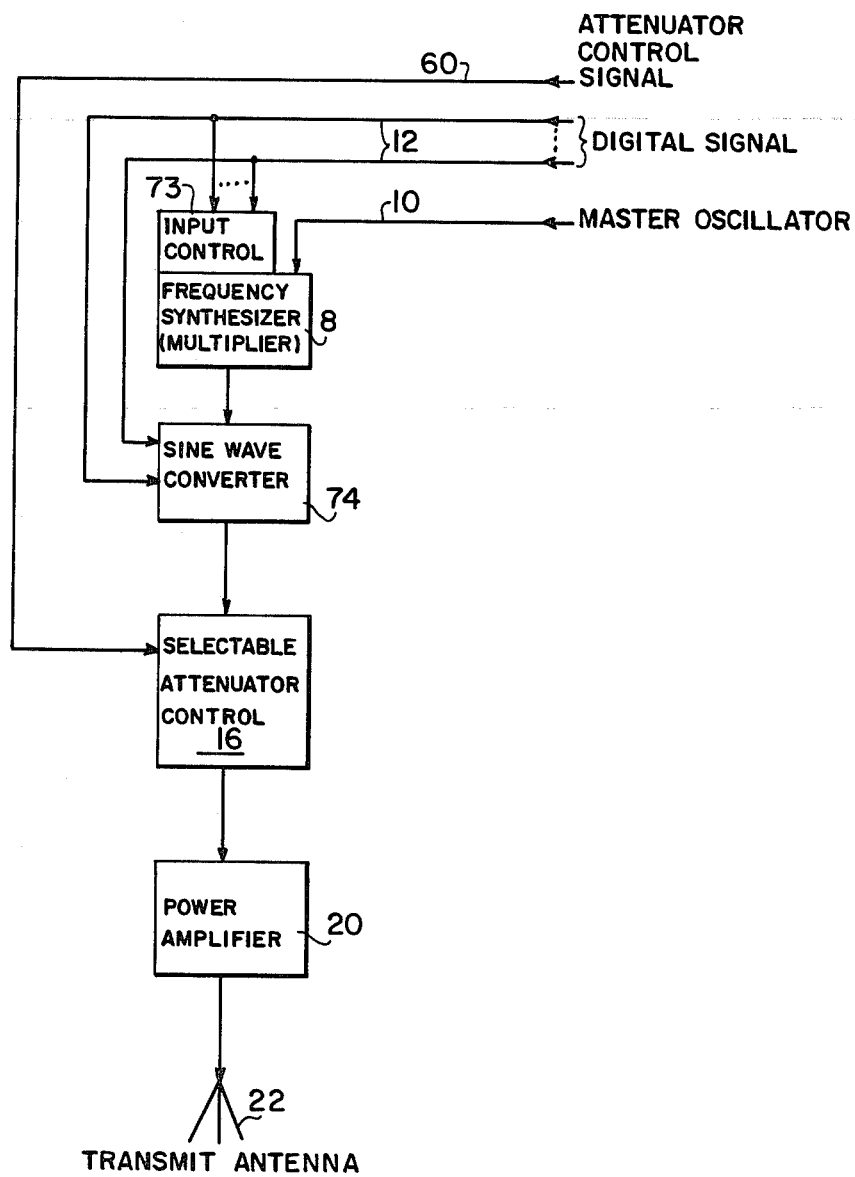
FIG. 2 is a more detailed schematic circuit diagram of the transmitter circuit illustrated in FIG. 1.

Turning now to FIG. 2, a somewhat more detailed schematic diagram of the transmitter of FIG. 1 is illustrated. In particular, frequency synthesizer 8 is designed to receive the base periodic signal on line 10 and successive digital signals on parallel lines 12 in the form of BDC signals having the format employed by a standard microprocessor system. One type of frequency synthesizer suitable for use in the transmitter illustrated in FIG. 2 is a Syntest Model No. SM160 manufactured by Syntest Corporation, 169 Millham Street, Marlboro, Massachusetts 01752. such a synthesizer includes an input control circuit 73 for receiving the BCD signals from lines 12 for use by the frequency synthesizer in multiplying the integers represented by these digital signals times the base periodic signal received from the master oscillator 68 over line 10. The signals from synthesizer 8 take the form of a square wave output which may be deemed a first base reference supplied to a sine wave converter 74 which is also connected with lines 12 to receive the digital signal representative of the integers by which the base periodic signal is to be multiplied. Converter 74 may be of the type sold by Syntest Corporation, supra, under Model No. SMO20. The output of converter 74 is in the form of a sine wave having the desired frequency which is then passed through a variable attenuator control 16 designed to allow for up to a total of 80 dB attenuation.

Attenuator control 16 may be formed by a pair of attenuators sold by Avantek, 3175 Bowers Avenue, Santa Clara, California as Model No. UTF040s. The amount of attenuation is controlled by the attenuator control signals provided over line 60 which signals are in the form of an analog current provided by controller 6. The purpose of attenuator control 16 is to reduce the input levels to the receiver so that there is no distortion in the receiver circuit. By providing such attenuation, maximum dynamic range capability is achieved.

The power amplifier 20 may be any linear amplifier which will operate over the desired frequency range. For example, the unit may be of the type manufactured by AilTec, 815 Broadlow Road, Farmingdale, New York, under Model No. 1020 having a 10 watt output capability. Antenna 22 is of a broad band configuration for transmission of the periodic component signals into the medium into which the geophysical phenomena is to be measured.

Figure 3:
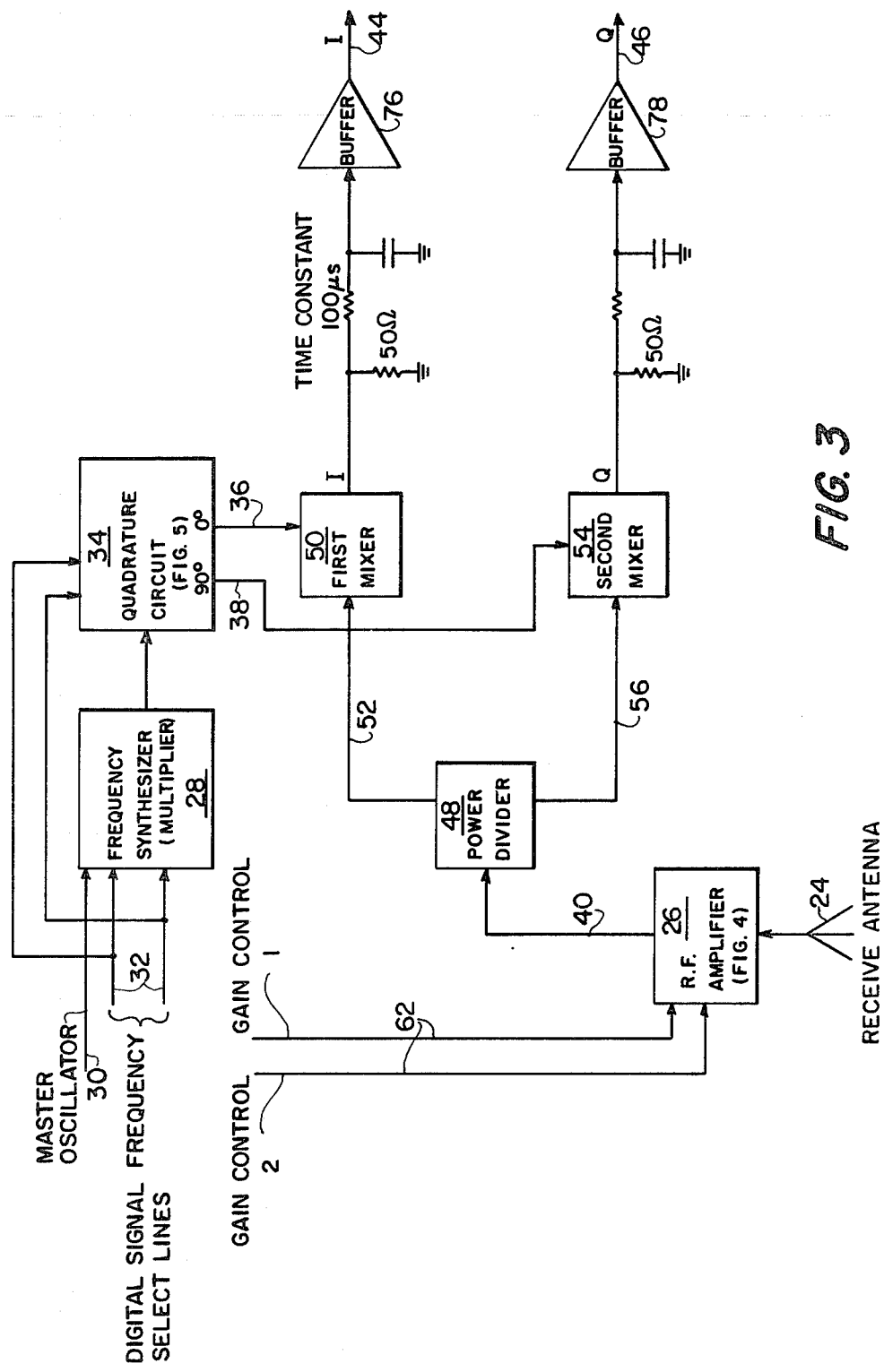
FIG. 3 is a more detailed schematic diagram of the receiver circuit employed in the system illustrated in FIG. 1.

Reference is now made to FIG. 3 wherein a more detailed diagramatic illustration of the receiver circuit 4 is shown with those components corresponding to the components illustrated in FIG. 1 being identified by the same reference numeral. FIG. 3 illustrates more clearly that frequency synthesizer 28 and quadrature circuit 34 constitute separate components each of which receives the digital signal supplied over lines 32 from the controller 6 to allow the frequency synthesizer to produce a first base reference equivalent to the output of synthesizer 8 in FIG. 1 by multiplying the base periodic signal received from master oscillator 66 over line 30 times the energy represented by the successive digital signals received on lines 32. The quadrature circuit 34, which will be described in greater detail hereinbelow with reference to FIG. 5, combines the signal received from synthesizer 28 with the same digital signals received by the synthesizer on lines 32 to produce the in-phase and quadrature reference signals on lines 36 and 38, respectively. The output from first mixer circuit 50 is supplied to line 44 through a RC circuit having a 100 microsecond time constant and a buffer amplifier 76. Similarly, the output of second circuit mixer 54 is passed through an identical RC circuit and buffer amplifier 78 to line 46.

Frequency synthesizer 28 may be of a type identical to synthesizer 8 while first and second mixer circuit may be of the type manufactured by Mini Circuits Laboratories Model No. SAN-3. Buffer amplifiers 76 and 78 are identified as Model No. LH0002 manufactured by National Semiconductor, 2900 Semiconductor Drive, Santa Clara, California. The signal provided to mixer circuits 50 and 54 is received from power divider circuit 48 which may be of the type manufactured by Mini Circuits Laboratories 837–843 Utica Avenue, Brooklyn, New York as Model No. PCS-2-1. Amplifier 26 will be discussed in greater detail hereinbelow with reference to FIG. 4, but, as can be seen in FIG. 3, the gain is controlled by two separate gain control signals received on line 62 thereby providing ample flexibility in maintaining maximum signal to noise ratio.

By providing two reference signals on lines 36 and 38 to produce an in-phase component I and a quadrature component Q on output lines 44 and 46, respectively, it is possible to measure the amplitude and phase of the signal returned to antenna 24 as a result of the broadcast and modulation of each of the periodic component signals making up the Fourier spectrum of the synthetic radar pulse produced by transmitter 2. The amplitude of the received signal as thus given by $A = \sqrt{I^2 + Q^2}$ and the phase is given by $\theta = \tan^{-1}(Q/I)$.

Figure 4:
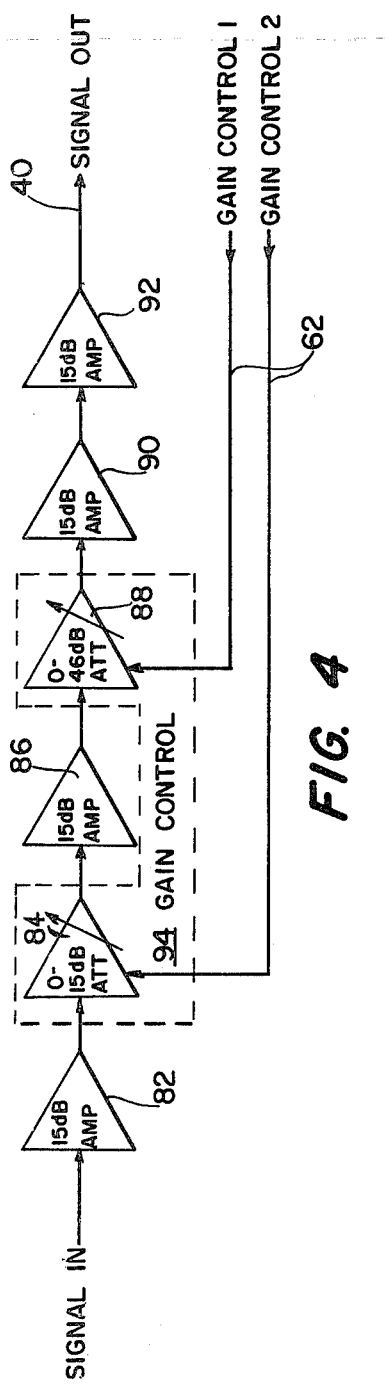
FIG. 4 is a schematic diagram of the radio frequency amplifier employed in the receiver circuit illustrated in FIGS. 1 and 3.

Referring now to FIG. 4, a more detailed schematic illustration of amplifier 26 is illustrated including four separate amplifiers and two attenuators. The total gain of this amplifier circuit is about 60 dB with about 55 dB of attenuation possible. The purpose of this circuit is to prevent distortion of the signals supplied to the mixing circuit 42 by the amplifier 26 prior to being mixed with the reference signals supplied from quadrature circuit 34. The input signal from antenna 24 is supplied to 15 dB amplifier 82 the output of which is supplied to a variable attenuator 84 having a maximum of 15 dB attenuation capability. The output of attenuator 84 is, in turn, connected to a second 15 dB amplifier 86 followed by a second variable attenuator 88 having a maximum of 46 dB attenuation capability. The output signal from amplifier 88 passes through two additional 15 dB amplifiers 90 and 92 to produce the electrical signal representative of the portion of the energy of each periodic component signal which has been modulated by the geophysical phenomena being measured. Attenuators 84 and 88 combine to form a gain control circuit 94 responsive to gain control signals received from the controller 6 on lines 62 to control the attenuation of variable attenuators 84 and 88, respectively.

Figure 5:
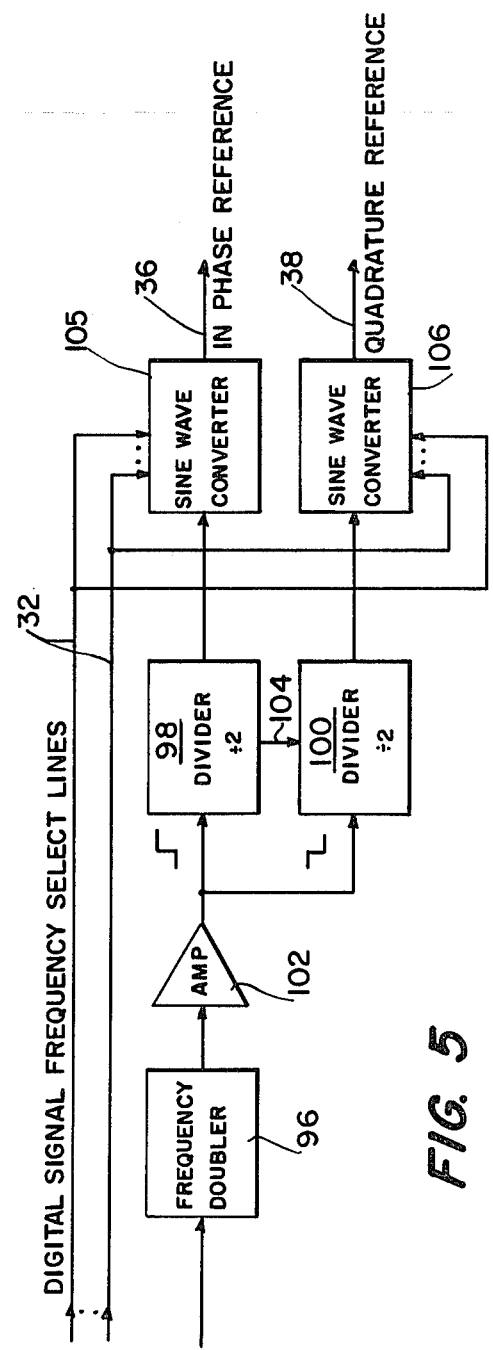
FIG. 5 is a schematic diagram of the quadrature circuit employed in the receiver circuit illustrated in FIGS. 1 and 3.

FIG. 5 is a more detailed schematic diagram of the quadrature circuit 34 including a frequency doubler 96 such as a Mini Circuits Laboratory RK2 which functions to double the frequency of the first base reference signal produced by frequency synthesizer 28. The output of doubler circuit 96 constitutes a second base reference signal having a frequency which is double the frequency of the periodic component signal being broadcast at any given time by transmitter circuit 2. The second base reference signal is supplied to a pair of divider circuits 98 and 100 after passing through buffer amplifier 102 such as a Avantek GPD402 manufactured by Avantek, supra. Divider 98 may be a flip flop circuit manufactured by Plessey, Semiconductor Products, 1641 Kaiser Avenue, Irvine, Calif., under Model No. SP1670 designed to trigger on the positive going transitions whereas the second divider 100, which may also be a Plessey SP1670 flip flop, is designed to trigger on the negative transitions. Divider 98 is connected through line 104 to cause divider 100 to follow operation of divider 98. By this arrangement, the output of divider 100 is caused to have a 90° out of phase relationship with respect to the output from divider circuit 98. The divider circuit outputs may be deemed an in-phase base reference signal and a quadrature base reference signal which are passed to sine wave converters 105 and 106, respectively, of the same type as illustrated in FIG. 2. Converters 105 and 106 are provided with the digital signals over lines 32 to allow converters 105 and 106 to operate in the same manner as is the sine wave converter 74 within the transmitter 2.

Figure 6:
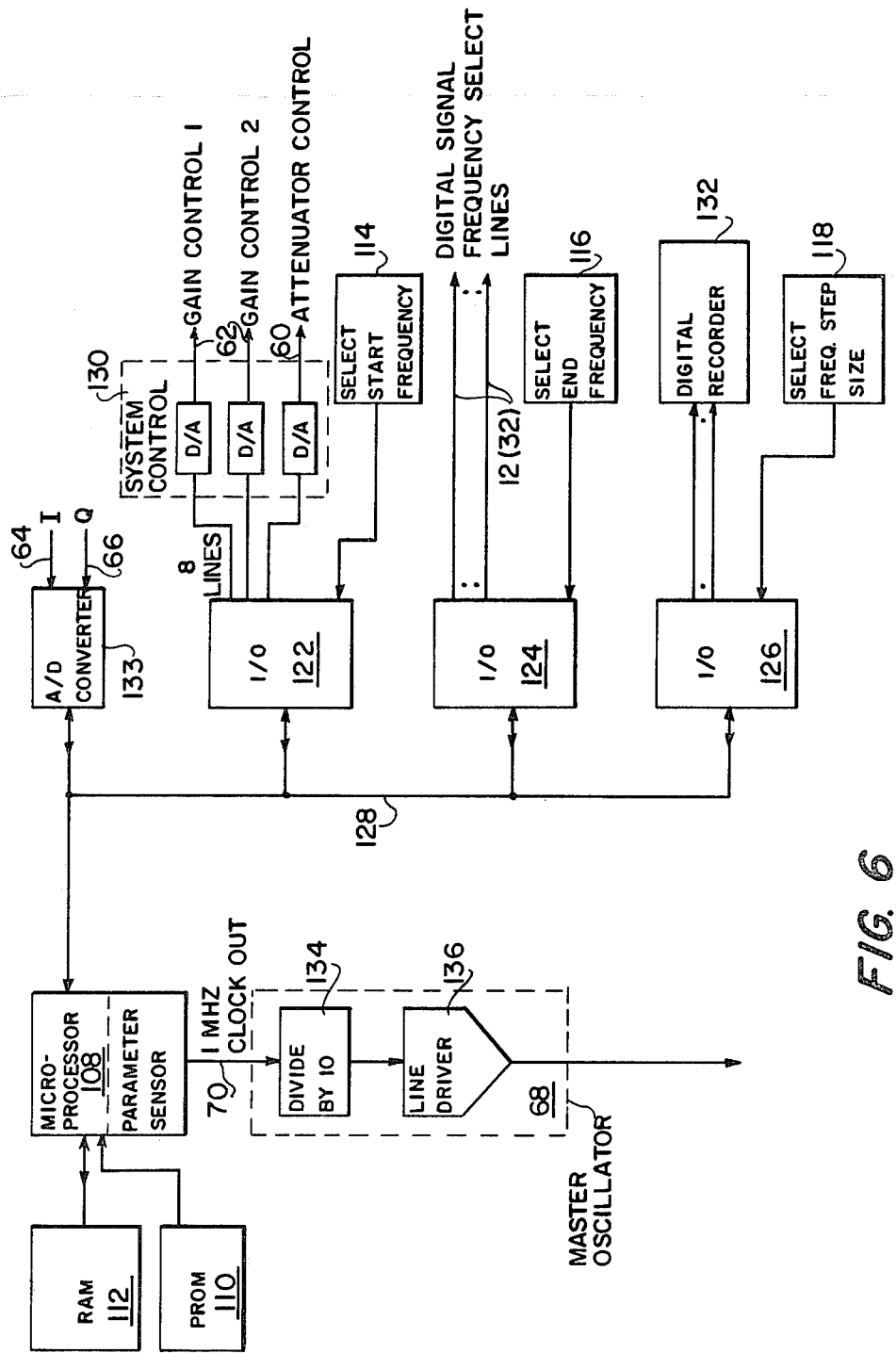
FIG. 6 is a more detailed schematic diagram of the controller circuit illustrated in FIG. 1.

Turning now to FIG. 6, a more detailed schematic diagram of the microprocessor based controller 6 is illustrated wherein those components previously discussed are identified by the same reference numerals as appear in FIGS. 1–5. The heart of the controller 6 is a microprocessor such as a Pro-Log PLS868 system manufactured by Pro-Log Corp., 2411 Garden Road, Monterey, California, with an 8K PROM 110 and a 2K RAM 112 an additional 4K RAM may also be used with the system. A plurality of operator controlled input switches 114, 116 and 118 are provided to permit manual selection of the starting frequency, the end frequency and the step separation between frequencies, respectively. Switches 114, 116 and 118 are connected to input/output circuits 122, 124 and 126, respectively, for connection to the microprocessor through a data transmission bus 128. Input/output circuit 122 also functions to provide analog gain control signals on line 62 for operating attenuators 84 and 88 in gain control circuit 94 within the receiver circuit 4. Input/output circuit 122 also provides analog attenuator control signals on line 60 for operating the attenuator control 16 of transmitter 2. The analog signals supplied to lines 60 and 62 are produced in the system control circuit 130 formed by three separate digital to analog converters of standard design. The input/output circuits 122, 124 and 126 may be of the type manufactured by Prolog under Model No. 760. Input/output circuit 124 is designed to forward the integer representing digital signals to the synthesizers 8 and 28, respectively, on lines 12 and 32. Input/output circuit 126 serves to provide signals to a digital read out recorder 132 for supplying information to the system operator, such as information concerning the geophysical phenomena being measured by the system. In-phase component and quadrature component signals supplied over line 64 and 66, respectively, are passed through an analog to digital converter 133 such as manufactured by Burr Brown, International Airport Industrial Park, Tucson, Arizona, under Model No. NP22, whereby microprocessor 108 is enabled to receive return digital signals representative of the in-phase and quadrature component signals for each of the corresponding periodic component signals broadcast by transmitter 2. Once all such return digital signals have been stored the microprocessor is programmed to compute the inverse transform of such signals to derive information regarding the geophysical phenomena being measured. Master oscillator 68 is supplied with a 1 MHz clock signal from the microprocessor system on line 70. This clock signal is divided by 10 in a divider circuit 134 the output of which is fed to a line driver 136 for producing the base periodic signal supplied to the transmitter circuit over line 10 and to the receiver circuit over line 30.

In operation, the microprocessor 108 is programmed to drive the system in the following manner. The system operator first selects the desired start and end frequencies by setting command switches 114 and 116 appropriately. The operator then selects the step size or frequency separation between each of the discrete frequencies making up the Fourier frequency spectrum of the desired synthetic radar pulse to be produced by the system by means of switch 118. These step sizes may be 100 KHz, 200 KHz, 500 KHz, 1 MHz, 2 MHz, 5 MHz or 10 MHz. Upon initiation of operation, the processor will provide digital signals over lines 12 and 32 representative of the first integer in the series of integers to be provided to the transmitter and receiver circuits. This first integer corresponds to and defines the frequency of the first periodic component signal making up the synthetic radar pulse. Before a reading is taken, the receiver gain is set over lines 62 at a minimum and the attenuator signal provided to the attenuator control 16 of the transmitter will be adjusted until the I and Q signals supplied over lines 64 and 66 are at a desired level. If the transmitter is transmitting full power and the levels are too low then the receiver gain control is adjusted. Once the gain is set, the I and Q levels are digitized and recorded. The digital recorder records the frequency, the gain control settings the attenuator setting, and the I value and the Q value. The processor then increments the digital signals supplied to lines 10 and 30 to represent the next integer in the series of integers required to define the next frequency line within the Fourier spectrum of frequencies defining the desired synthetic radar pulse. The process described above proceeds to allow broadcast of each of the periodic component signals making up the synthetic radar pulse until all of the I and Q values for each corresponding component has been recorded. Once the end frequency is reached, the time trace can be reconstructed by inverse transforming the I and Q values.

INDUSTRIAL APPLICABILITY

The disclosed synthetic short pulse radar system has high resolution and good penetration which makes it well suited to map most ore deposits and in fact is capable of mapping any electrical discontinuity that is more than a few feet in extent. Other uses include the mapping of ice thickness in the polar regions, mapping subsurface stratigraphy from within tunnels and mines and the measurement of coal thickness for controlling automated mining machines. Numerous additional applications of the disclosed synthetic pulse radar system are apparent from the above description.

What is claimed is:

1. A digitally controlled, synthetic pulse radar, comprising
    (a) a transmitter means generating during each of a plurality of successive time intervals one of a corresponding plurality of periodic component signals each of which has a uniquely discrete frequency which is an integral multiple of a predetermined base frequency to approximate the Fourier transform of a short pulse suitable for transmission toward and modulation by geophysical phenomena, said transmitter means including:
        (1) first multiplier means for generating said periodic component signals by multiplying a base periodic signal times each one of a series of integers, said multiplier means including input control means for receiving a digital signal representative of each said integer by which the base periodic signal is to be multiplied during each said successive time interval, and
        (2) antenna means connected with said multiplier means for broadcasting said successively generated periodic component signals toward the geophysical phenomena which is to be measured;
    (b) receiver means for recovering representative parameters of each said periodic component signal which has been modulated by the geophysical phenomena being measured by producing a recovered electrical signal representative of a portion of the energy of each periodic component modulated by said geophysical phenomena, said receiver means including mixing means for producing a parameter signal representing said recovered parameters for each broadcasted periodic component signal by mixing said recovered electrical signal with a reference signal having a frequency equal to the original frequency of the corresponding periodic component signal broadcast by said antenna means; and
    (c) controller means connected with said input control means for providing said digital signals representing the series of integers by which said base period signal is multiplied during said successive time intervals, respectively.

2. A synthetic pulse radar as defined in claim 1, wherein said control means includes means for inverse transforming said representative parameters to permit derivation of information about the geophysical phenomena, said controller means including a master oscillator means for generating said base periodic signal.

3. A synthetic pulse radar as define in claim 1, wherein said transmitter means includes attenuator control means for controlling the strength of the periodic component signals broadcast by said antenna means in response to an attenuator control signal and wherein said receiver means includes gain control means for controlling the strength of said parameter signal produced by said mixer means in response to a gain control signal and further wherein said controller means includes system control means for providing said attenuator control signal and said gain control signals to said attenuator control means and to said gain control means, respectively, to optimize signal to noise ratio in said parameter signal.

4. A synthetic pulse radar as defined in claim 3, wherein said controller means includes parameter sensing means connected with said mixer means for controlling said attenuator and gain control signals in response to the values represented by said parameter signals produced by said mixer means.

5. A synthetic pulse radar as defined in claim 1, wherein said master oscillator means is a wave generator and said base periodic signal is a square wave output from said square wave generator and said first multiplier means is a first frequency synthesizer means for receiving the wave output from said wave generator and said digital signal from said controller means to produce a first base reference signal having a frequency equal to the product of the frequency of the wave output produced by said wave generator and the integer represented by said digital signal and wherein said transmitter means further includes a sine wave converter means for forming said periodic component signal by converting the first base reference signal from said frequency synthesizer into a sine wave signal having the frequency of the periodic component signal broadcast during each time interval.

6. A synthetic pulse radar as defined in claim 1, wherein the frequency of said base periodic signal is 100 KHz and wherein the frequency of said periodic component signals varies from 16 MHz to 160 MHz.

7. A synthetic pulse radar as defined in claim 1, wherein said receiver means includes a quadrature circuit means for producing an in-phase reference signal which has the same frequency and phase as the periodic component signal broadcast during each time interval and a quadrature reference signal which has the same frequency and a 90° phase shift relative to the periodic component signal broadcast during each time interval, and wherein said mixing means includes a first mixer circuit means for mixing said in-phase reference signal with said recovered electrical signal to produce an in-phase component of said parameter signal and second mixer circuit means for mixing said quadrature reference signal with said recovered electrical signal to produce a quadrature component of said parameter signal.

8. A synthetic pulse radar as defined in claim 7, wherein said receiver means includes a second frequency synthesizer means for receiving said base periodic signal from said master oscillator means and said digital signals from said controller means for producing a first base reference signal having the same frequency and phase as each said periodic component signal broadcast by said transmitter means during each said time interval and wherein said quadrature circuit means includes
  (1) a frequency doubler means for producing a second base reference signal having a frequency which is twice the frequency of said first base reference signal,
  (2) first and second divider circuit means connected for receiving said second base reference signal from said frequency doubler means and for producing, respectively, an in-phase base reference signal having the same frequency and phase as said first base reference signal and a quadrature base reference signal having the same frequency and a 90° phase shift relative to said first base reference signal, and
  (3) first and second sine wave converter means for converting, respectively, said in-phase base reference signal and said quadrature base reference signal into said in-phase reference signal and said quadrature reference signal.

9. A synthetic pulse radar as defined in claim 1, wherein said controller means includes a computer means for controlling said transmitter means and said receiver means by providing said digital signals to control the frequency of said periodic component signals and said corresponding reference signals, said computer means including
  (1) input means for receiving operator commands defining the minimum and maximum frequencies of said periodic component signals and defining each of said integer values to be represented by said digital signals,
  (2) a random access memory circuit means for storing digital return signals representative of said parameter signals, and
  (3) microprocessor circuit means for responding to said operator commands to cause said transmitter means to broadcast said periodic component signals in said time intervals in accordance with said command signals and to process said recovered representative parameters by computing the inverse transform of said stored digital return signals to yield information regarding the geophysical phenomenal being measured.

10. A synthetic pulse radar as defined in claim 9, wherein said master oscillator means and said microprocessor circuit means are syncronized to operate in phase with the same clock signal.

11. A synthetic pulse radar as defined in claim 4, wherein said controller means includes a computer means for controlling said transmitter means and said receiver means by providing said digital signals to control the frequency of said periodic component signals and said corresponding reference signals, said computer means including
  (1) input means for receiving operator commands defining the minimum and maximum frequencies of said periodic component signals and defining each of said integer values to be represented by said digital signals,
  (2) a random access memory circuit means for storing digital return signals representative of said parameter signals, and
  (3) microprocessor circuit means for responding to said operator commands to cause said transmitter means to broadcast said periodic component signals in said time intervals in accordance with said command signals and to provide said attenuator and gain control signals in response to the value of said digital return signals and further to process said recovered representative parameters by computing the inverse transform of said stored digital return signals to yield information regarding the geophysical phenomena being measured.

12. A synthetic pulse radar for detecting geophysical phenomena at a maximum range of up to 500 feet, comprising
  (a) a transmitter means for approximating the Fourier transform of a radar short pulse suitable for transmission toward and modulation by a geophysical target by generating during each of a plurality of successive time intervals one of a corresponding plurality of periodic component signals each of which has a uniquely discrete frequency between 16 MHz and 160 MHz separated by at least 100 KHz; and
  (b) receiver means for determining representative parameters of each said periodic component signal which has been modulated by the geophysical phenomena being measured to permit derivation of information about the geophysical phenomena, said receiver means including mixing means for producing a parameter signal representing said recovered parameter for each broadcasted periodic component by mixing a recovered electrical signal representative of a portion of the energy of each periodic component modulated by said geophysical phenomena with a reference signal having a frequency signal equal to the original frequency of the period component signal broadcast by said transmitter means.

13. A method for detecting geophysical phenomena by use of synthetic pulse radar, comprising the steps of (a) generating a base periodic signal having a predetermined base frequency;

(b) generating a succession of digital signals representative of a series of integers which when multiplied times the base frequency yields a plurality of frequencies defining the Fourier spectrum of a desired radar pulse;

(c) generating successively a plurality of periodic component signals having frequencies corresponding to the plurality of frequencies representing the Fourier spectrum of the desired radar pulses by multiplying the base periodic signal times each of the integers in the series of integers represented by the digital signals generated in step (b);

(d) broadcasting the periodic component signals toward a geophysical phenomena during successive time intervals, respectively;

(e) recovering a portion of the energy of each periodic signal modulated by the physical phenomena;

(f) generating electrical signals representative of the portions of energy recovered in step (e) corresponding to each of the periodic component signals;

(g) generating a parameter signal representing parameters of each recovered portion of a periodic component signal which has been modulated by the physical phenomena being measured by mixing each electrical signal generated in step (f) with a reference signal having a frequency equal to the frequency of the corresponding periodic component signal broadcast in step (d);

(h) generating and storing digital return signals corresponding, respectively, to said parameter signals generated in step (g).

14. A method as defined in claim 13, further including the step of computing the inverse transform of the stored digital return signals to yield information regarding the geophysical phenomena being measured.

15. A method as defined in claim 12, wherein the step of generating a plurality of periodic component signals includes the step of controlling the amplitude of each of said periodic component signals in order to minimize distortion in the steps of generating a parameter signal corresponding to each periodic component signal.

* * * * *